J. W. GISRIEL.
CABLE STRIPPING MACHINE.
APPLICATION FILED JULY 22, 1908.

923,426.

Patented June 1, 1909.
3 SHEETS—SHEET 1.

Witnesses

Inventor
John W. Gisriel
By
Attorney

J. W. GISRIEL.
CABLE STRIPPING MACHINE.
APPLICATION FILED JULY 22, 1908.

923,426.

Patented June 1, 1909.
3 SHEETS—SHEET 3.

Witnesses

Inventor
John W. Gisriel
By Redford M. Smith
Attorney

UNITED STATES PATENT OFFICE.

JOHN WALTER GISRIEL, OF BALTIMORE, MARYLAND.

CABLE-STRIPPING MACHINE.

No. 923,426.

Specification of Letters Patent.

Patented June 1, 1909.

Application filed July 22, 1908. Serial No. 444,758.

*To all whom it may concern:*

Be it known that I, JOHN WALTER GIS-RIEL, a citizen of the United States, residing at Baltimore city and State of Maryland, have invented a certain new and useful Cable-Stripping Machine, of which the following is a specification, reference being had therein to the accompanying drawing.

This invention relates to cable stripping machines, the object of the invention being to provide a machine for cutting and disintegrating underground and overhead cables and facilitating the recovery of the lead casings and copper strand fillings of the cables in an expeditious and practical manner.

A further object of the invention is to provide in connection with oppositely arranged cutters for severing the outer casing of the cables, means for varying or adjusting the relative distance between the cutters in order to accommodate cables of different sizes.

A further object of the invention is to provide cutters which are yielding and self-adjusting in order to accommodate inequalities or undulations.

A still further object of the invention is to provide means for feeding the cables through the main throat of the machine and for varying or adjusting the distance between the feed rolls to accommodate cables of different sizes.

A further object of the invention is to provide in connection with the cutter driving shafts, means for varying or adjusting the distance between said shafts; also means for permitting the cutters carried by said shafts to shift lengthwise of the shafts without effecting their operative relation to the other parts of the machine.

With the above and other objects in view, the nature of which will more fully appear as the description proceeds, the invention consists in the novel construction, combination and arrangement of parts as herein fully described, illustrated and claimed.

Figure 1:
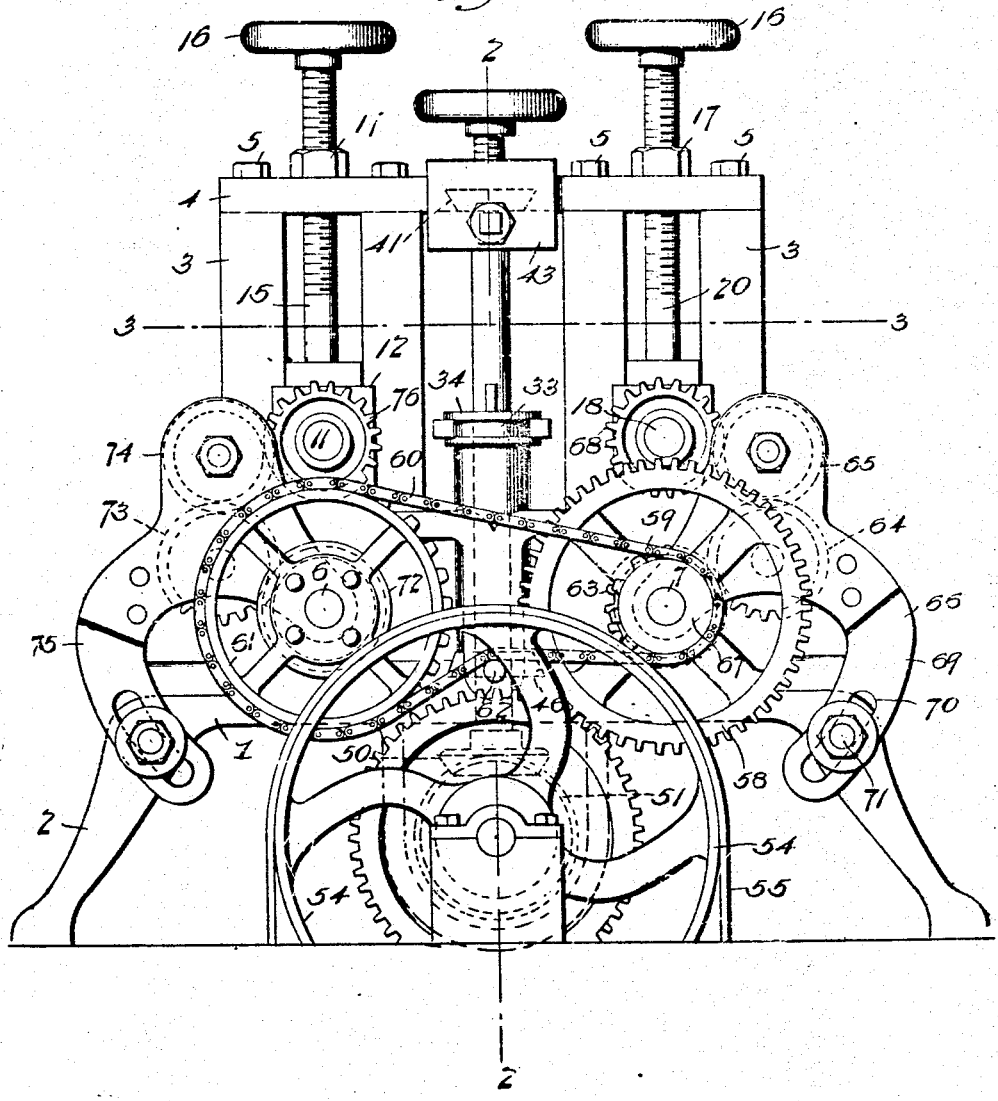
Figure 2:
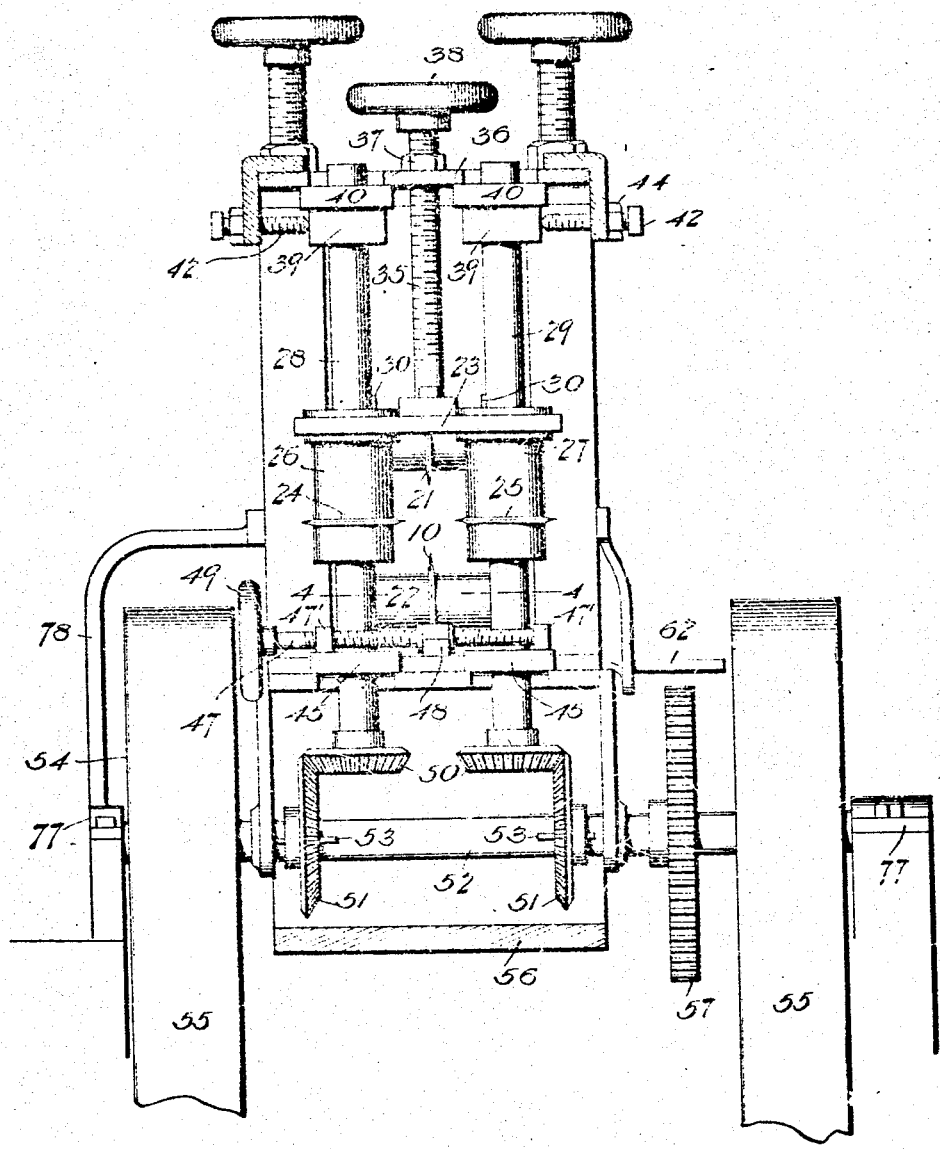
Figure 3:
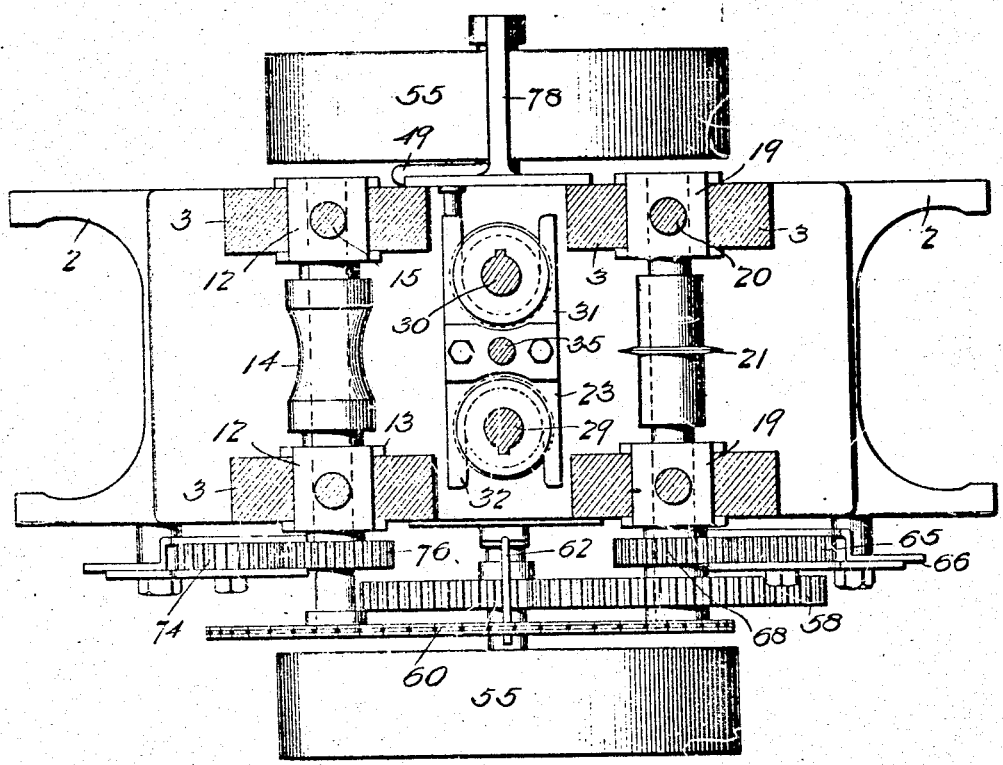
Figure 4:
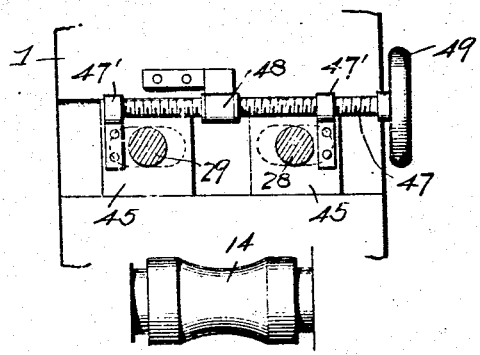
Figure 5:

In the accompanying drawings:—Figure 1 is a side elevation of a cable stripping machine embodying the present invention. Fig. 2 is a central vertical transverse section thereof on the line 2—2 of Fig. 1. Fig. 3 is a horizontal section through the machine on the line 3—3 of Fig. 1. Fig. 4 is a detail horizontal section through the central portion of the machine taken on the line 4—4 of Fig. 2. Fig. 5 is a detail elevation of the feed rolls.

The machine comprises a suitable frame embodying a horizontal support or base 1 which is sustained at a suitable elevation by means of supporting legs 2 while extending upward from the base is a plurality of standards 3 arranged in parallel pairs, as best shown in Figs. 1 and 3, said standards being tied together at their upper ends by means of cap pieces or tie bars 4 held in place by bolts or screws 5 or their equivalent.

Arranged just above the base 2 are parallel shafts 6 and 7, 6 designating the lower feed roll shaft which carries the positively driven feed roll 8 provided with cable engaging teeth 9, while the shaft 7 has mounted thereon the lower cutter 10. The shafts 6 and 7 are mounted in stationary bearing boxes just above the base 1 and between the pairs of parallel standards 3, said boxes being similar to those shown in Figs. 1 and 3 but arranged beneath the boxes shown in said figures. Above the shaft 6 is arranged the upper feed roll shaft 11 which is journaled in bearing boxes 12 movable up and down between the parallel standards 3, each of said boxes being provided at opposite sides with guide flanges 13 which bear against opposite sides of the standards 12 as best shown in Fig. 3. The shaft 11 carries the upper feed roll 14 which is an idler or a driven roll. In other words, the upper feed roll 14 does not need to be positively driven but it will suffice for said roll to be driven by contact with the cable in its passage through the machine. Both the lower feed roll 9 and the upper feed roll 14 are provided with concaved peripheries as shown in Fig. 5, and the lower positive feed roll has the teeth 9 projecting from such concaved periphery so as to engage the under side of the cable and force the same onward through the machine. The upper feed roll 14 is rendered adjustable toward and away from the lower feed roll in order to accommodate cables of different sizes by making the bearings adjustable up and down between the standards 13 which is accomplished by means of a pair of adjusting screws 15 having a keyed or shouldered engagement at their lower ends with the boxes 12 and having a threaded engagement where they pass through the cap pieces 4 of the frame. Each of said screws is provided at its upper end with a hand wheel 16 for adjusting it and may also be locked by means of a jam nut 17 which may be turned up tightly against the cap pieces 4.

Arranged above the shaft 7 is the upper cutter shaft 18 the same being journaled in boxes 19 arranged between the parallel standards 3 at the opposite side of the center of the machine which boxes correspond with the sliding boxes 12 above described and are rendered adjustable in the same manner by means of adjusting screws 20 having the same relation to the frame of the machine. This provides for adjusting the upper rotary cutter 21 upward and downward or in other words toward and away from the cutter 10. The cutter 10 is carried by a sleeve 22 fast on the lower cutter shaft 7 while the upper cutter 21 is carried by a sleeve 23 fast on the upper cutter shaft 18 both of which shafts are positively driven by the gearing hereinafter described.

In addition to the upper and lower rotary cutters 21 and 10, oppositely arranged side cutters 24 and 25 are provided which are carried by sleeves 26 and 27, respectively, the same being shiftable lengthwise of a pair of oppositely arranged shafts 28 and 29 extending about vertically and located within the planes of the standards 3 as shown in Fig. 2. Furthermore each of the sleeves 26 and 27, while adapted to slide on its respective shaft 28 or 29 is keyed to said shaft as shown at 30 so that each of the side cutters is driven by its respective shaft. The side cutters 24 and 25 are rendered adjustable up and down by means of a yoke or double fork 31 in the form of a plate disposed horizontally and having fork ends 32 which are received in the grooves 33 of collars 34 on the upper ends of the sleeves 26 and 27, the yoke being adjusted up and down by means of a yoke adjusting screw 35 having a keyed engagement at its lower end with the yoke and threaded through the top 36 on the frame where it may be held fixed by means of a jam nut 37 adapted to turn up tightly against the frame. The screw 35 is further provided at its upper end with a hand wheel 38 to facilitate the adjustment of the screw. In addition to the up and down adjustment of the yoke 31, said yoke is adapted to oscillate upon its center relatively to the point where it is connected to the lower end of the adjusting screw 35, the connection between the adjusting screw 35 and the yoke 31 being of such a loose nature as to admit of a limited oscillatory movement of said yoke, this being for the purpose of permitting the side cutters 24 and 25 to yield upward and downward or shift relatively to each other in parallel planes to accommodate themselves to inequalities, irregularities or undulations in the cable as it passes through the throat of the machine, which throat is seen in Fig. 2 as defined or bounded by the sleeves by which the several rotary cutters are carried.

The shafts 28 and 29 are journaled at their upper ends in horizontally shiftable slide bearings 39 having dove-tailed portions or flanges 4 which are received in a dove-tailed guide-way or groove 41 in the upper part of the frame, the bearings 39 being held toward each other by oppositely arranged set screws 42 threaded through lugs or brackets 43 on the upper part of the frame and adapted to be fixed by means of jam nuts 44. Below the cutters 24 and 25, the shafts 28 and 29 are journaled in bearings 45 of dove-tailed shape in cross section and mounted to slide horizontally in a dove-tailed guide way or groove 46 in the frame, the said bearings being adjusted toward and away from each other for varying the distance between the side cutters by means of an adjusting screw 47 having right and left hand screw threaded portions as shown in Figs. 2 and 4, such right and left hand threaded portions engaging threaded extensions 47 of the bearings 45 and being journaled centrally in a fixed bearing 48 while at one end said screw is provided with a hand wheel 49 for effecting said adjustment which is accomplished by shifting the lower ends of the shafts 28 and 29 toward and away from each other.

The shafts 28 and 29 are provided at their lower ends with bevel gears 50 fast thereon and meshing with corresponding slide bevel gears 51 which are keyed to the main driving shaft 52 of the machine as shown at 53, whereby the gears 51 are constantly driven by the shaft 52 but adapted to slide lengthwise thereon to accommodate the lateral shifting movements of the shafts 28 and 29. The shaft 52 is provided with one or two driving pulleys 54 adapted to receive one or two driving belts 55 from any suitable source of power. The gearing 50 and 51 is also preferably inclosed by means of a suitable housing or casing 56 extending downward below the base 1 of the machine-frame as shown in Fig. 2. Mounted fast on the shaft 52 is a spur gear wheel 57 which meshes with a corresponding gear wheel 58 on the lower cutter shaft 7. On the same shaft 7 there a sprocket wheel 59 from which a drive chain 60 runs around a larger sprocket wheel 61 on the lower feed roll shaft 6. The drive shaft 60 also runs over a chain lift or guide 62 to keep the same away from the wheel 57. On the same shaft 7 there is mounted a spur pinion 63 which meshes with one of a pair of intermediate pinions 64 and 65 carried by a gear bracket 66 having an arm 67 which is journaled on the shaft 7 as shown by dotted lines in Fig. 1. The other intermediate gear 67 meshes with a spur pinion 68 on the upper cutter shaft 18 whereby said upper cutter is positively driven. In order to provide for the up and down adjustment of the shaft 18 and gear wheel 68, the bracket 66 is provided with an arcuate arm 69 slotted as at 70 to receive a clamping bolt 71 engaging the frame as shown in Fig. 1 so that by loosening the bolt 71 the bracket 66 may be swung to effect an engagement between the wheels 65 and 68, irrespective of the position of the wheel 68. In like manner the shaft 6 is provided with a spur gear wheel 72 which meshes with one of a pair of intermediate pinions 73 and 74 carried by a gear bracket 75 corresponding with the bracket 69 and adjustable in the same manner. The pinion 74 meshes with a spur pinion 76 on the upper feed roll shaft 11 where it is desired to positively drive said upper feed roll shaft and it will be seen that this may be done irrespective of the elevation or position of said pinion 76 and the shaft 11.

In view of the foregoing description, it will be seen that each and all of the rotary cutters are positively driven and that one or both of the feed rolls may also be positively driven motion being imparted to all operative elements of the machine from the common or main driving shaft 52. It will further be seen that the relative distance between the opposite rotary cutters may be adjusted to suit cables of different sizes, that a corresponding adjustment may be effected with regard to the feed rolls, and the side cutters are capable of adjusting themselves or yielding to inequalities or irregularities in the cables thereby imparting flexibility to the machine as a whole and preventing breakage when subjected to undue strains due to sudden kinks or bends in the cable passing through the machine.

The shaft 52 is shown as mounted in suitable bearings 77 while 78 designates a brace extending from one of said bearings upward over one of the band wheels and connecting at its upper end with the standards 2 at one side of the frame.

I claim:—

1. A cable-stripping machine comprising a cable-receiving throat, and rotary circular cutters having cylindrical bodies which serve to limit the depth of their cut, said cutters being arranged in opposing pairs in said throat and operating to split the outer cable casing lengthwise into strips as it traverses the throat.

2. A cable-stripping machine comprising a cable-receiving throat, and rotary circular cutters having cylindrical bodies which serve to limit the depth of cut, said cutters being arranged in opposing pairs in the throat and operating to split the outer cable casing lengthwise into strips as it traverses the throat.

3. A cable stripping machine comprising a cable-receiving throat, and cable splitting cutters arranged in said throat and operating to split the cable lengthwise as it traverses the throat, said cutters embodying cylindrical hub-like bodies which serve to limit the depth of cut of the cutters.

4. A cable stripping machine comprising a cable-receiving throat, oppositely arranged cable splitting cutters working in said throat, an oscillatory yoke engaging the cutters, and means for adjusting said yoke to vary the position of the cutters.

5. A cable-stripping machine comprising a cable-receiving throat, cutters arranged at opposite sides of the throat, and an oscillatory yoke connected with said cutters for controlling the shifting movement of the cutters.

6. A cable-stripping machine comprising a cable-receiving throat, cutters arranged at opposite sides of the throat, and an oscillatory yoke connected with said cutters and provided with forked ends by which the cutters are supported.

7. A cable-supporting machine comprising a cable-receiving throat, revolving circular cutters arranged radially at opposite sides of said throat, and means for varying the distance between said cutters.

8. A cable-stripping machine comprising a cable-receiving throat, revolving circular cutters arranged radially at opposite sides of the throat, and means for adjusting said cutters radially of the throat toward and away from each other.

9. A cable-stripping machine comprising a cable-receiving hroat, revolving circular cutters arranged at opposite sides of said throat, and means for adjusting one cutter toward and away from the opposite cutter radially of the throat.

10. A cable-stripping machine comprising a cable-receiving throat, cutters arranged at opposite sides of the said throat, and oppositely arranged cutter shafts for imparting motion to said cutters, the cutters having a keyed and slidable engagement with said shafts.

11. A cable-stripping machine comprising a cable-receiving throat, oppositely arranged cutter shafts, shiftable cutters having a keyed and slidable engagement with said shafts, and means permitting said cutters to shift on their respective shafts while in motion.

12. A cable-stripping machine comprising a cable-receiving throat, oppositely arranged cutter shafts, shiftable cutters movable lengthwise of their respective shafts, means permitting said cutters to shift on their respective shafts while in motion, and means for varying the distance between said shafts.

13. A cable stripping machine comprising a cable-receiving throat, revolving circular cutters arranged in said throat and operating to cut the cable casing lengthwise as it traverses the throat, means for adjusting the cutters toward and away from a common center, and means for centering the cutters.

14. A cable-stripping machine comprising a cable-receiving throat, circular knives arranged radially in said throat and operating to split the cable casing lengthwise into strips as it traverses the throat, and means for feeding the cable along the throat.

15. A cable-stripping machine comprising a cable-receiving throat, circular knives arranged radially in said throat and operating to split the cable casing lengthwise into strips as it traverses the throat, and oppositely arranged feed rolls adapted to force the cable past the cutters.

16. A cable-stripping machine comprising a cable-receiving throat, circular knives arranged radially in said throat and operating to split the cable casing lengthwise into strips as it traverses the throat, a positively driven feed roll, and an oppositely arranged presser roll.

17. A cable-stripping machine comprising a cable-receiving throat, revolving circular cutters arranged in said throat and operating to split the cable casing lengthwise as it traverses the throat, and cable feed mechanism including a positively driven toothed feed roll.

18. A cable-stripping machine comprising a cable-receiving throat, circular knives arranged radially in said throat and operating to split the cable casing lengthwise into strips as it traverses the throat, and cable feeding mechanism including oppositely arranged feed rolls and means for adjusting the distance between the feed rolls to accommodate cables of different sizes.

In testimony whereof I affix my signature in presence of two witnesses.

J. WALTER GISRIEL.

Witnesses:
 ROBT. K. GROFF,
 CARY D. HALL, Jr.